(12) United States Patent
Diehl et al.

(10) Patent No.: US 7,235,173 B2
(45) Date of Patent: Jun. 26, 2007

(54) HYDROTREATING CATALYST THAT CONTAINS A NITROGEN-CONTAINING ORGANIC COMPOUND AND ITS USE

(75) Inventors: Fabrice Diehl, Rueil Malmaison (FR); Christophe Bouchy, Rueil Malmaison (FR); Tivadar Cseri, Courbevoie (FR); Slavik Kasztelan, Rueil Malmaison (FR)

(73) Assignee: Institut Francais du Petrole, Cedex (FR)

( * ) Notice: Subject to any disclaimer, the term of this patent is extended or adjusted under 35 U.S.C. 154(b) by 222 days.

(21) Appl. No.: 10/612,288

(22) Filed: Jul. 3, 2003

(65) Prior Publication Data

US 2004/0055936 A1 Mar. 25, 2004

(30) Foreign Application Priority Data

Jul. 3, 2002 (FR) .................... 02 08343

(51) Int. Cl.
*C10G 45/04* (2006.01)
*C10G 45/60* (2006.01)
*B01J 31/00* (2006.01)

(52) U.S. Cl. ............... 208/216 R; 208/217; 208/251 H; 208/143; 502/150; 502/158; 502/162

(58) Field of Classification Search ................ 502/150, 502/20, 158, 162; 208/216 R, 217, 251 H, 208/143
See application file for complete search history.

(56) References Cited

U.S. PATENT DOCUMENTS

| | | | | |
|---|---|---|---|---|
| 2,946,739 A | * | 7/1960 | Gardner et al. ............. | 208/112 |
| 3,855,307 A | * | 12/1974 | Rony et al. ................. | 568/454 |
| 3,928,443 A | * | 12/1975 | Allain et al. ................ | 564/127 |
| 4,271,269 A | * | 6/1981 | Franzmann et al. ........ | 435/176 |
| 5,478,918 A | * | 12/1995 | Maruta et al. .............. | 528/353 |
| 5,935,414 A | * | 8/1999 | Sonnemans et al. ......... | 208/58 |
| 6,037,300 A | * | 3/2000 | Kasztelan et al. .......... | 502/204 |
| 6,267,874 B1 | * | 7/2001 | Iijima et al. ................ | 208/217 |
| 6,290,841 B1 | * | 9/2001 | Gabrielov et al. .......... | 208/213 |
| 6,291,394 B1 | * | 9/2001 | Shukis et al. ............... | 502/355 |
| 6,313,062 B1 | * | 11/2001 | Krylova et al. ............. | 502/326 |
| 6,325,920 B1 | * | 12/2001 | Brun et al. ............. | 208/216 R |
| 6,331,574 B1 | * | 12/2001 | Lapidus et al. ............. | 518/709 |
| 6,436,280 B1 | * | 8/2002 | Harle et al. ............. | 208/216 R |
| 6,436,870 B1 | * | 8/2002 | Iijima et al. ................ | 502/305 |
| 6,534,437 B2 | * | 3/2003 | Eijsbouts et al. ........... | 502/313 |
| 6,540,908 B1 | * | 4/2003 | Eijsbouts et al. ....... | 208/216 R |
| 6,541,417 B2 | * | 4/2003 | Kasztelan et al. .......... | 502/325 |
| 6,566,296 B2 | * | 5/2003 | Plantenga et al. .......... | 502/162 |
| 6,576,584 B1 | * | 6/2003 | Iijima et al. ................ | 502/202 |
| 6,583,286 B1 | * | 6/2003 | Bottcher et al. ............ | 546/185 |
| 6,635,599 B1 | * | 10/2003 | Eijsbouts et al. ........... | 502/305 |
| 6,652,738 B2 | * | 11/2003 | Eijsbouts et al. ....... | 208/216 R |
| 6,765,026 B2 | * | 7/2004 | Krylova et al. ............. | 518/721 |
| 2005/0159296 A1 | * | 7/2005 | Ginestra et al. ............. | 502/30 |

FOREIGN PATENT DOCUMENTS

| | | | |
|---|---|---|---|
| EP | 0164162 A | * | 12/1985 |
| EP | 1043069 A | * | 10/2000 |
| WO | WO 9531280 A1 | * | 11/1995 |

* cited by examiner

*Primary Examiner*—Karl Group
(74) *Attorney, Agent, or Firm*—Millen, White, Zelano & Branigan, P.C.

(57) ABSTRACT

A hydrotreating catalyst that contains at least one element of group VIB and/or group VIII of the periodic table and optionally phosphorus and/or silicon, with an organic compound as an additive that contains at least one nitrogen atom, is used for the transformation of hydrocarbon-containing fractions, in particular the hydrodesulfurization, the hydrodenitrification, the hydrodemetallization, the hydrogenation of various petroleum fractions, such as residues, vacuum distillates, gas oils and gasolines, and the hydroconversion of vacuum distillates.

10 Claims, No Drawings

HYDROTREATING CATALYST THAT CONTAINS A NITROGEN-CONTAINING ORGANIC COMPOUND AND ITS USE

The invention relates to the field of catalysts and hydrotreatment processes utilizing said catalysts.

A particular object of the invention is to provide a catalyst that can be used in hydrotreatment processes, in particular in the processes of hydrodesulfurization, hydrodenitrification, hydrodemetallization, hydrogenation and hydroconversion of petroleum fractions.

Another object of the invention is the preparation of such a catalyst.

Upon further study of the specification and appended claims, other objects and advantages of the invention will become apparent.

Usually, a catalyst for hydrotreatment of hydrocarbon-containing fractions has as its function to eliminate the sulfur-containing compounds or the nitrogen-containing compounds that are contained in the latter so as to bring, for example, a petroleum product up to the required specifications (sulfur content, aromatic compound content, etc . . . ) for a given application (automobile fuel, gasoline or gas oil, domestic fuel, jet fuel). It can also involve pretreating this feedstock so as to remove impurities from it before subjecting it to various transformation processes to modify its physico-chemical properties (reforming, hydrocracking of vacuum distillates, hydroconversion of atmospheric or vacuum residues). The composition and the use of hydrotreatment catalysts are particularly well described in the article by B. S. Clausen, H. T. Topsøe, and F. E. Massoth, obtained from the work Catalysis Science and Technology, Volume 11 (1996), Springer-Verlag.

The stepping-up of the automobile pollution standards for the year 2005 in the European Community (Off. J. Eur. Comm., L 350, Dec. 28, 1998, page 58) will make it necessary for the refiners to reduce very greatly the sulfur content in the gas oils and the gasolines (at most 50 parts per million by weight (ppm) of sulfur in the gas oils on Jan. 1, 2005, compared to 350 ppm on Jan. 1, 2000). These constraints will be reflected by a need for new refining units or else by a strong increase in activity at the iso-volume of the hydrotreatment catalysts. An efficient means for increasing the activity of the catalysts is to increase the amount of active phase (usually of molybdenum (or tungsten) sulfide) upgraded by nickel or cobalt and supported on a porous substrate such as alumina, silica, silica-alumina, etc.). The maximum amount of active phase that can be deposited (usually by dry impregnation), however, is limited by the textural properties of the substrate and in particular its specific surface area and its pore volume. Another solution, more recently mentioned in the literature, is the addition to the catalyst of organic additives that would make it possible to improve its activity. This is the case, for example, of International Application WO-A-96/41848 of the Sumitomo Metal Mining Company, in which a hydrotreating catalyst is impregnated by a solution that contains a polyol that consists of a carbon-containing chain with a length from 2 to 10 carbon atoms. The use of such a catalyst that is "used as an additive" would increase the activity of the catalyst by hydrodesulfurization of straight distillation gas oil cuts in a proportion of up to +108% relative to the catalyst that is not used as an additive. In Patent Application EP-A-0 601 722 of the Sumitomo Metal Mining company, the applicant notes a substantial increase of activity when the additive is incorporated in the dry impregnation solution. The additive is, in this case also, constituted by a polyol or a polysaccharide that is equipped with a carbon-containing chain of 2 to 10 carbon atoms as well as by their ethereal derivatives.

The drawback of these preparation methods is the use of, for example, glycol ethers whose toxicity to man is demonstrated. Furthermore, the polyol-type compounds (for example, polyethylene glycol, saccharose in solution), have viscosities that can be very high and prove incompatible with dry impregnation, whereby it is understood that in such a preparation process, it is essential that the impregnation solution can easily diffuse into the pores of the preformed substrate, in particular when balls or extrudates are involved. Finally, during the decomposition of these compounds under sulfurization atmosphere in the presence of hydrogen and hydrogen sulfide at high temperature and optionally under pressure, the formation of coke that is obtained from an incomplete decomposition of the polyol can be responsible for a deactivation by poisoning (coking) of the active sites. Loss of activity is then very detrimental to the competitiveness of such a process to the extent that the specifications, for example on the maximum sulfur content, become increasingly strict, which involves high constraints in terms of operating conditions.

The invention proposes a new hydrotreating catalyst comprising at least one element of group VIB and/or group VIII of the periodic table and optionally phosphorus and/or silicon, and as an additive an organic compound containing at least one nitrogen atom selected in a general way from among the compounds that correspond to the generic formula:

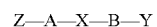

in which:

X=—CH$_2$—, —NH—, —NR—, —O—, with R=—H, alkyl or alkenyl (for example allyl);

Z=—CH$_3$, —OCH$_3$, —NH$_2$, —NR1R2, —Si(O—CH$_3$)$_3$, —OH with R1 and R2=—H, alkyl or alkenyl;

Y=—CH$_3$, —OCH$_3$, —NH$_2$, —NR3R4, —Si(O—CH$_3$)$_3$, —OH with R3 and R4=—H, alkyl or alkenyl;

A=—O—, —NH—, —(CH$_2$)$_t$-, with t=1 to 11, —C$_n$H$_{2n-2}$ with n=1 to 11, or else

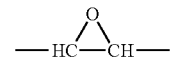

and

B=—O—, —NH—, —(CH$_2$)$_t$-, with t=1 to 11, —C$_n$H$_{2n-2}$ with n=1 to 11, or else

It is essential in this invention that the organic additive have at least one nitrogen atom. Examples of compounds that correspond to the generic general formula above can include but are not limited to:

Compounds that contain at least one primary, secondary and/or tertiary amine group, such as hexamethylenediamine, monoethanolamine, diethanolamine, triethanolamine and N,N-dimethyl-N'-ethylethylenediamine;

Amino alcohols, such as, for example, 2(2-amino ethyl amino)ethanol, 2(2-aminoethoxy) ethanol, 2-amino-1-butanol, 4-amino-1-butanol, 2,2-diethoxyethylamine, 4,4- diethoxybutylamine, 6-amino-1-hexanol, 2-amino-1,3-propanediol, 3-amino-1,2-propanediol, 3-amino-1-propanol; and Amino alkoxy-silanes, such as, for example, (3-glycidoxypropyl)trimethoxysilane, 3-(2-aminoethylamino) propyltrimethoxysilane and (3-aminopropyl)trimethoxy-silane.

In the catalysts of the invention, the amount of organic compound as defined above can go from 0.05 to 2.5 mol per mol, preferably 0.1 to 1 mol per mol, of metal from group VIB and/or VIII that is deposited on the substrate.

The process for preparation of the catalyst of this invention will be described below. Generally, it comprises the deposit of at least one metal of groups VIB and VIII of the periodic table on a porous substrate with an alumina base or a silica-alumina base and the impregnation of said substrate by an organic compound.

To a large extent, the catalyst of this invention can be prepared by any method that is well known to one skilled in the art.

The matrix that is generally used has an alumina base (in general at least 40% by weight of alumina) and preferably essentially consists of alumina or silica-alumina.

The hydro-dehydrogenating elements (of groups VIB and/or VIII of the periodic table) can be introduced at least in part during the mixing that is used in the shaping of the matrix or else, and preferably, after this shaping.

The shaping is followed by a calcination stage that ends between 250 and 650° C. One of the preferred methods in this invention consists in mixing the moist alumina gel (hydrated aluminum oxyhydroxide) then in passing the thus obtained paste through a die to form extrudates with a diameter of preferably between 0.4 and 4 mm.

The catalyst also contains a hydrogenating function. The hydrogenating function is ensured by the metal of group VIB of the periodic table, molybdenum and/or tungsten and/or also by the metal of group VIII, cobalt and/or nickel. It can be introduced into the catalyst at various levels of preparation and with various methods. In the case where a significant hydrodesulfurization activity is desired, the metals of the hydro-dehydrogenating function consist of the cobalt-molybdenum combination; if a high level of hydrodenitrification activity is desired, a combination of nickel with molybdenum or tungsten will be preferred. It can be introduced either partially or completely at the time of mixing with the oxide gel that is selected as a matrix, whereby the remainder of the hydrogenating elements are then introduced after mixing and more generally after calcination of the preformed substrate.

The metal of group VIB is preferably introduced at the same time or just after the metal of group VIII, regardless of the method of introduction. It can be carried out preferably by one or more ion exchange operations on the calcined substrate or even more preferably by dry impregnation of the substrate, with solutions that contain the precursor salts of the metals.

It can be carried out by one or more operations for impregnation of the substrate that is shaped and calcined by a solution of the precursor(s) of the oxide of the metal of group VIII when the precursor(s) of the oxides of the metal of group VIB has (have) first been introduced at the time of mixing of the substrate.

In the case where the elements are introduced in several impregnations of the corresponding precursor salts, an intermediate calcination stage of the catalyst is in general carried out at a temperature of between 250 and 500° C. Promoters of the activity of the catalyst such as phosphorus or silicon can also be present. Thus, phosphorus or silicon can be introduced at any time during the preparation, including but not limited to the following examples. The promoters can be introduced alone or in a mixture with the metal or the metals of group VIB and/or of group VIII. They can be introduced just before or just after the peptization of the aluminum oxyhydroxide (boehmite), precursor of alumina. They can also be introduced on the alumina extrudate with or without intermediate calcination. They can also be introduced in a mixture with the metal of group VIB or the metal of group VIII, completely or partially on the alumina in extruded form with or without intermediate calcination, or can also be introduced only at the end.

As indicated above, the preparation process relative to this invention includes a phase for activation of the catalyst in the presence of an organic compound. Usually, the hydrorefining catalysts are prepared by impregnation of a preformed substrate, then the solvent of metal salts (usually water) is eliminated by drying and finally, it often proves necessary to calcine the catalyst in air at high temperature (350 to 500° C.) so as to eliminate the non-metallic counter ions (nitrates, oxalates, ammonium, etc.).

Before use, it is often necessary to transform the catalyst, where the metals are in an oxide form, to a sulfide catalyst so as to form the active radical (sulfide of the metal of group VIB promoted by the metal of group VIII). This activation phase is carried out under a reducing environment in the presence of hydrogen and hydrogen sulfide. In the process for preparation of the catalysts of the invention, it is particularly advantageous that this action phase takes place in the presence of the organic additive.

The organic compound can be introduced by dry impregnation on the hydrotreatment catalyst or else co-impregnated simultaneously with the metal or metals of groups VIB and VIII or else be present in the sulfurization feedstock so as to be deposited during the sulfurization stage of the catalyst. It can be added, for example, to the sulfur-containing compound that is usually used to increase the sulfur content of the sulfurization feedstock (dimethyl disulfide, dimethyl sulfide, n-butylmercaptan, polysulfide compound such as tert-nonylpolysulfide (for example TPS-37 or TPS-54 marketed by the ATOFINA Company).

The catalysts that are obtained by this invention are used for hydrorefining and hydroconversion of hydrocarbon-containing feedstocks such as the petroleum fractions, the hydrocarbon fractions are obtained from coal or hydrocarbons are produced from natural gas. The catalyst are used more particularly for hydrogenation, hydrodenitrification, hydrodeoxygenation, hydrodearomatization, hydrodesulfurization, hydrodemetallization and hydroconversion of hydrocarbon-containing feedstocks that contain aromatic compounds and/or olefinic compounds and/or naphthenic compounds and/or paraffinic compounds, whereby said feedstocks optionally contain metals and/or nitrogen and/or oxygen and/or sulfur. In these uses, the catalysts that are obtained by this invention exhibit an activity that is improved relative to the prior art.

More particularly, the feedstocks that are used in the process are gasolines, gas oils, vacuum gas oils, atmospheric residues, vacuum residues, atmospheric distillates, vacuum distillates, heavy fuels, oils, waxes and paraffins, waste oils, deasphalted residues or crude oils, feedstocks that are obtained from thermal or catalytic conversion processes and mixtures thereof. In general, they contain heteroatoms such as sulfur, oxygen and nitrogen and/or at least one metal.

As indicated above, the catalysts that are used as additives according to the method described in this invention can be used in a large number of hydrorefining or hydroconversion applications. The operating conditions that can be applied in these processes are usually: a temperature of 180 to 450° C. (preferably between 250 and 440° C.), a pressure of 0.5 to 30 MPa (preferably between 1 and 18 MPa), an hourly volumetric flow rate of 0.1 to 20 h$^{-1}$ (preferably between 0.2 and 5 h$^{-1}$), a hydrogen/feedstock ratio that is expressed by volume of hydrogen, measured under normal conditions of temperature and pressure, by volume of liquid feedstock generally from 50 l/l to 2000 l/l.

The catalysts of this invention can also advantageously be used during pretreatment of the catalytic cracking feedstocks and in the first stage of hydrocracking or mild hydroconversion. They are then usually used combined with an acid catalyst that may or may not be zeolitic for the second stage of the treatment.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

For all the examples of preparation of catalysts of this invention, an alumina was used as a substrate.

Example 1

Preparation of a Catalyst C1 Such as CoMoP (not in Accordance with the Invention)

A matrix that consists of ultrafine tabular boehmite or alumina gel, marketed under the name SB3 by the Condéa Chemie GmbH company, was used. This gel was mixed with an aqueous solution that contains nitric acid at 66% (7% by weight of acid per gram of dry gel), then mixed for 15 minutes. At the end of this mixing, the paste that is obtained is passed through a die that has cylindrical orifices with a diameter that is equal to 1.3 mm. The extrudates are then dried for one night at 120° C., then calcined at 550° C. for 2 hours in moist air that contains 7.5% by volume of water. Cylindrical extrudates with a diameter of 1.2 mm, having a specific surface area of 255 m$^2$/g, a pore volume of 0.60 cm$^3$/g and a monomodal pore size distribution that is centered on 100 Å, are thus obtained. The analysis of the matrix by the x-ray diffraction reveals that the latter consists only of cubic gamma-alumina with low crystallinity.

On the alumina substrate that is described above and that comes in "extruded" form, cobalt, molybdenum and phosphorus were added. The salts of these three elements are introduced simultaneously by dry impregnation of the substrate. The cobalt salt that is used is cobalt hydroxide, the molybdenum precursor is molybdenum oxide MoO$_3$, and the phosphorus is introduced in the form of phosphoric acid H$_3$PO$_4$. The impregnation solution is prepared by dissolution at 90° C. of molybdenum oxide in the phosphoric acid solution that is diluted in water so as to obtain a solution volume that is equivalent to the pore volume of the alumina. After dry impregnation, the extrudates are allowed to mature in a water-saturated atmosphere for 12 hours, then they are dried for one night at 120° C. and finally calcined at 500° C. for 2 hours in dry air. The final contents of metal oxides and the specific surface area of the catalyst (determined according to the BET method that is well known to one skilled in the art) are then the following:

| | |
|---|---|
| MoO$_3$: | 18.2 (% by weight) |
| CoO: | 4.1 (% by weight) |
| P$_2$O$_5$: | 5 (% by weight) |
| Specific surface area: (S$_{BET}$) | 180 (m$^2$/g) |

Example 2

Preparation of a Catalyst C2 Such as CoMoP with 2(2-amino ethyl amino)ethanol as an Additive and Simply Dried (According to the Invention)

Catalyst C2 is prepared by dry reimpregnation of catalyst C1 by a water +2(2-amino ethyl amino)ethanol solution such that the amount of additive is 0.75 mol/mol of Mo that is present in catalyst C1. After impregnation, the extrudates are allowed to mature in a water-saturated atmosphere for 12 hours, then they are dried at 120° C. for 2 hours.

Example 3

Preparation of a Catalyst C3 Such as CoMoP with 2(2-amino ethyl amino)ethanol as an Additive and Calcined at 500° C. (According to the Invention)

Catalyst C3 is prepared in a way identical to that of catalyst C2, but a calcination stage at 500° C. in air is added. An elementary analysis by a combustion method shows that catalyst C3 no longer has carbon after its calcination.

Example 4

Preparation of a Catalyst C4 Such as CoMoP that is Dried and has 2(2-amino ethyl amino)ethanol as an Additive (According to the Invention)

Catalyst C4 is obtained by a reimpregnation of dried catalyst C2 by a water +2(2-amino ethyl amino)ethanol solution that is conducted such that the amount of additive that is introduced during this second impregnation is 0.75 mol/mol of Mo that is present in the catalyst. After a maturation of 12 hours, the extrudates are dried at 120° C. for 2 hours. Catalyst C4 is therefore prepared by two successive impregnations (of the active phase, then the organic compound) that are separated from one another by a simple drying at 120° C.

Example 5

Comparative Test of Catalysts C1, C2, C3 and C4 by Hydrogenation of Toluene in the Cyclohexane Under Pressure in the Presence of Hydrogen Sulfide The description of the test conditions that are described in detail appears in Example 9.

The relative volumetric hydrogenating activities, determined after about 3 to 4 hours of stabilization, are recorded in the table below. Catalyst C1 that is not used as an additive was selected as a reference (activity base 100%).

TABLE 1

Relative Hydrogenation Activities of Catalysts C1 to C4

| Catalyst | $A_{HYD}$ relative to C1 |
|---|---|
| C1 | 100 |
| C2 | 142 |
| C3 | 115 |
| C4 | 131 |

It is noted, surprisingly, that catalysts C2, C3 and C4 that are prepared according to this invention exhibit a significant gain in activity relative to reference catalyst C1 that does not employ as an additive (and not in accordance with this invention).

Example 6

Preparation of a Catalyst C5 Such as NiMoP (Not in Accordance with the Invention)

The alumina substrate was dry-impregnated by an aqueous solution that contains molybdenum and nickel salts and phosphoric acid $H_3PO_4$.

The molybdenum salt is hydrated ammonium heptamolybdate of formula $Mo_7O_{24}(NH_4)_6 \cdot 4H_2O$ and that of nickel is hydrated nickel nitrate of formula $Ni(NO_3)_2 \cdot 6H_2O$. After maturation at ambient temperature in a water-saturated atmosphere, the impregnated extrudates are dried for one night at 120° C., then calcined at 500° C. for 2 hours in dry air. The final content of molybdenum trioxide is 16% by weight. The final content of nickel oxide NiO is 3.0%. The final content of phosphorus is 6% by weight expressed in $P_2O_5$.

Example 7

Preparation of a Catalyst C6 Such as NiMoP with 2(2-amino ethyl amino)ethanol as an Additive and Simply Dried (According to the Invention)

Catalyst C6 is prepared by a dry reimpregnation of catalyst C5 by a water +2(2-amino ethyl amino)ethanol solution, conducted such that the amount of additive is 0.75 mol/mol of Mo that is present in catalyst C5. After impregnation, the extrudates are allowed to mature in a water-saturated atmosphere for 12 hours, then they are dried at 120° C. for 2 hours.

Example 8

Preparation of a Catalyst C7 Such as NiMoP with 2(2-amino ethyl amino)ethanol as an Additive and Calcined at 500° C. (According to the Invention)

Catalyst C7 is prepared in a way that is identical to that of catalyst C6, but a calcination stage at 500° C. in air is added. An elementary analysis by a combustion method shows that catalyst C7 no longer has carbon.

Example 9

Hydrogenation Tests of Toluene of Catalysts C5, C6 and C7

Catalysts C5, C6 and C7, described above, are sulfurized in situ under dynamic conditions in the tubular fixed-bed reactor that is traversed by a Catatest®-type pilot unit (manufacturer: Géomécanique company), whereby the fluids circulate upward. The measurements of hydrogenating activity are carried out immediately after sulfurization under pressure without reexposure to air with the hydrocarbon feedstock that is used to sulfurize the catalysts.

The sulfurization and test feedstock consists of 5.8% dimethyl disulfide (DMDS), 20% toluene and 74.2% cyclohexane (by weight). The stabilized catalytic activities with equal volumes of catalysts C5, C6 and C7 thus are measured in the hydrogenation reaction of toluene.

The conditions for measurement of activity are as follows:

| | |
|---|---|
| Total pressure: | 6.0 MPa |
| Pressure of toluene: | 0.38 MPa |
| Pressure of cyclohexane: | 1.55 MPa |
| Pressure of hydrogen: | 3.64 MPa |
| Pressure of $H_2S$: | 0.22 MPa |
| Volume of catalyst: | 40 cm3 |
| Feedstock flow rate: | 80 cm3/h |
| Hourly volumetric flow rate: | 2 l/l/h$^{-1}$ |
| Hydrogen flow rate: | 36 l/h |
| Sulfurization and test temperature: | 350° C. (3° C./min) |

Sampling of the liquid effluent is analyzed by gas phase chromatography. The determination of molar concentrations of unconverted toluene (T) and concentrations of its hydrogenation products: methylcyclohexane (MCC6), ethyl-cyclopentane (EtCC5) and the dimethylcyclopentanes (DMCC5) make it possible to calculate a toluene hydrogenation rate $X_{HYD}$ that is defined by:

$$X_{HYD}(\%) = 100 * \frac{(MCCC6 + EtCC5 + DMCC5)}{(T + MCC6 + EtCC5 + DMCC5)}$$

While the hydrogenation reaction of the toluene is on the order of 1 under the test conditions that are used and the reactor behaves like an ideal piston reactor, hydrogenating activity $A_{HYD}$ of the catalysts is calculated by applying the formula:

$$Ai = ln(100/(100 - X_{HYD}))$$

Table 2 compares the relative hydrogenating activities, equal to the ratio of the activity of the catalyst that is being considered to the activity of catalyst C5 that is taken as a reference (100% activity).

TABLE 2

Relative Activities of Hydrogenation of Catalysts C5 to C7

| Catalyst | $A_{HYD}$ Relative to C5 |
|---|---|
| C5 | 100 |
| C6 | 150 |
| C7 | 115 |

Surprisingly, Table 2 shows the significant gain of activity obtained on the catalysts that are prepared according to the invention relative to the reference catalyst that is not used as an additive.

Example 10

Hydrodesulfurization Test of a Gas Oil

Catalysts C5, C6 and C7, described above, have also been compared in a hydrodesulfurization test of a gas oil whose main characteristics are provided below:

| | |
|---|---|
| Density at 15° C.: | 0.8522 |
| Sulfur: | 1.44% by weight |
| Simulated distillation: | |
| PI | 155° C. |
| 10% | 247° C. |
| 50% | 315° C. |
| 90% | 392° C. |
| PF | 444° C. |

The test is conducted in an isothermal pilot reactor with a flushed fixed bed, whereby the fluids circulate upward. After in-situ sulfurization at 350° C. in the pressurized unit with the test gas oil to which is added 2% by weight of dimethyl disulfide, the hydrodesulfurization test was carried out under the following operating conditions:

| | |
|---|---|
| Total pressure: | 7 MPa |
| Volume of catalyst: | 30 cm³ |
| Temperature: | 340° C. |
| Hydrogen flow rate: | 24 l/h |
| Feedstock flow rate: | 60 cm³/h |

The catalytic performance levels of the catalysts that are tested are provided in the following table. They are expressed in relative activity by assuming that that of catalyst C5 is equal to 100 and by considering that they are on the order of 1.5. The equation that links the activity and the hydrodesulfurization conversion (% HDS) is as follows:

$$A_{HDS} = \frac{100}{[(100 - \% \, HDS)]} 0.5 - 1$$

TABLE 3

Activity of Catalysts in Hydrodesulfurization of Gas Oil

| Catalyst | $A_{HDS}$ Relative to C5 |
|---|---|
| C5 | 100 |
| C6 | 170 |
| C7 | 130 |

Surprisingly, Table 3 shows the significant gain of activity that is obtained on the prepared catalysts according to the invention relative to the reference catalyst that is not used as a catalyst.

Example 11

Test of Hydrotreatment of a Vacuum Distillate

Catalysts C5, C6 and C7, described above, were also compared in a hydrotreatment test of a vacuum distillate whose primary characteristics are provided below:

| | |
|---|---|
| Density at 20° C.: | 0.9365 |
| Sulfur: | 2.92% by weight |
| Total nitrogen: | 1400 ppm by weight |
| Simulated distillation: | |
| PI | 361° C. |
| 10% | 430° C. |
| 50% | 492° C. |
| 90% | 567° C. |
| PF | 598° C. |

The test is conducted in an isothermal pilot reactor with a flushed fixed bed, whereby the fluids circulate upward. After in-situ sulfurization at 350° C. in the pressurized unit with a direct distillation gas oil to which is added 2% by weight of dimethyl disulfide, the hydrotreatment test was conducted under the following operating conditions:

| | |
|---|---|
| Total pressure: | 12 MPa |
| Volume of catalyst: | 40 cm³ |
| Temperature: | 380° C. |
| Hydrogen flow rate: | 40 l/h |
| Feedstock flow rate: | 40 cm³/h |

The catalytic performance levels of the catalysts that are tested are provided in Table 4 below. They are expressed in relative activity, by assuming that that of catalyst C5 is equal to 100 and by considering that they are on the order of 1.5. The equation that links that activity and the hydrodesulfurization conversion (% HDS) is as follows:

$$A_{HDS} = \frac{100}{[(100 - \% \, HDS)]} 0.5 - 1$$

The same equation can be applied for hydrodenitrification (% HDN and $A_{HDN}$).

Furthermore, the crude conversion into fractions having a boiling point of less than 380° C. that is obtained with each catalyst is also evaluated. It is expressed from simulated distillation results (ASTM D86 method) by the equation:

Conversion=(% 380⁺ feedstock−% 380⁻ effluent)/% 380⁺ feedstock

TABLE 4

Activity of Catalysts in Hydrotreatment of Vacuum Distillate

| Catalyst | $A_{HDS}$ Relative to C5 | $A_{HDN}$ Relative to C5 | Conversion 380° C.-(%) |
|---|---|---|---|
| C5 | 100 | 100 | 25 |
| C6 | 145 | 150 | 30 |
| C7 | 115 | 120 | 27 |

Surprisingly, Table 4 shows the significant gain of activity that is obtained on the catalysts that are prepared according to the invention relative to the reference catalyst that is not used as an additive.

Example 12

Preparation of a Catalyst C8 Such as CoMo (not in Accordance with the Invention)

Cobalt and molybdenum are added to an alumina substrate that comes in the form of extrudates. These two elements are introduced simultaneously by dry impregnation of the substrate. The cobalt salt that is used is cobalt nitrate, whereby the molybdenum precursor is tetrahydrated ammonium heptamolybdate. The impregnation solution is prepared by dissolution of the ammonium heptamolybdate in water, then by adding Co nitrate. After dry impregnation, the extrudates are allowed to mature in a water-saturated atmosphere for 12 hours, then they are dried for one night at 120° C. and finally calcined at 500° C. for 2 hours in dry air.

The final contents of metal oxides and the specific surface area of the catalyst (determined according to the BET method that is well known to one skilled in the art) are then as follows:

| | |
|---|---|
| $MoO_3$: | 17.0% by weight |
| CoO: | 6.3% by weight |
| Specific surface area: ($S_{BET}$) | 205 m²/g |

Example 13

Preparation of a Catalyst C9 Such as CoMo that is Dried and Has 2(2-amino ethyl amino)ethanol as an Additive (According to the Invention)

Catalyst C9 is obtained by a reimpregnation of calcined catalyst C8 by a water +2(2-amino ethyl amino)ethanol solution that is conducted such that the amount of additive is 0.75 mol/mol of Mo that is present in the catalyst. After a maturation of 12 hours, the extrudates are dried at 120° C. for 2 hours.

Example 14

Comparative Test of Selective Hydrodesulfurization of an FCC Gasoline-Type Model Feedstock Catalysts C8 and C9 that are described above were tested in the selective desulfurization reaction of an FCC gasoline-type model feedstock. The test is carried out in a Grignard-type (batch) reactor at 200° C. under a pressure of 3.5 MPa of hydrogen that is kept constant. The model feedstock consists of 1000 ppm of methyl-3 thiophene and 10% by weight of dimethyl 2,3-butene-2 in n-heptane. The solution volume is 210 cm³ when cold, whereby the catalyst mass that is tested is 4 grams (before sulfurization). Before the test, the catalyst is first sulfurized in a sulfurization bank, in an $H_2S/H_2$ mixture (4 l/h, 15% by volume of $H_2S$) at 500° C. for two hours (ramp of 5° C./minute), then reduced under pure $H_2$ at 200° C. for two hours. The catalyst is then transferred into the Grignard reactor that is protected from air.

The rate constant (normalized per g of catalyst) is calculated by considering an order of 1 for the desulfurization reaction ($K_{HDS}$) and an order of 0 for the hydrogenation reaction ($K_{HDO}$). The selectivity of a catalyst is defined by the ratio of its speed constants, $K_{HDS}/K_{HDO}$. The relative rate constants of catalysts C8 and C9 as well as their selectivity are recorded in Table 5 below.

TABLE 5

Relative Speed Constants and Selectivity of Catalysts $C_8$ and $C_9$

| Catalyst | $k_{HDS}$ | $k_{HDO}$ | $k_{HDS}/k_{HDO}$ |
|---|---|---|---|
| C8 | 1.0 | 2.32 | 0.43 |
| C9 | 1.5 | 2.72 | 0.55 |

Surprisingly, catalyst C9 proves both more active in desulfurization and more selective than catalyst C8 (anomalous).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for preparation of a catalyst comprising at least one element of groups VIB and VIII of the periodic table deposited on a porous substrate, and as an additive at least one organic compound selected from the group consisting of hexamethylene diamine, monoethanolamine, diethanolamine, triethanolamine, N,N-dimethyl-N'-ethyl-ethylene diamine, an amino alcohol and an amino alkoxysilane, the process comprising impregnation of a porous substrate by the metal or metals of group VIB and/or group VIII and the deposit on said substrate of said organic compound, and a sulfurization stage, wherein the organic compound is present in the sulfurization feedstock and is deposited during the sulfurization stage.

2. A process according to claim 1, wherein the additive is 2(2-amino ethyl amino)ethanol, 2 (2-amino- ethoxy)ethanol, 2-amino-1-butanol, 4-amino-1-butanol, 2,2-diethoxyethylamine, 4,4-diethoxybutylamine, 6-amino-1-hexanol, 2-amino-1,3-propanediol, 3-amino-1,2-propanediol or 3-amino-1-propanol.

3. A process according to claim 1, wherein the additive is (3-glycidoxypropyl)trimethoxy silane, 3-(2-aminoethylamino)propyl-trimethoxysilane or (3-aminopropyl)trimethoxysilane.

4. A process according to claim 1, wherein the amount of said organic compound in the catalyst is produced 0.05 to 2.5 mol per mol of metal (metals) of group VIB and/or of group VIII deposited on the substrate.

5. A process according to claim 4, wherein the amount of said organic compound in the catalyst produced is 0.1 to 1 mat per mol of metal (metals) of group VIB and/or group VIII deposited on the substrate.

6. A process according to claim 1, wherein said porous substrate comprises at least 40% by weight of alumina.

7. A process according to claim 6, wherein said porous substrate consists essentially of alumina or silica-alumina.

8. A process according to claim 1, further comprising calcining said catalyst.

9. A hydrotreating catalyst comprising at least one element of group VIB and group VIII of the periodic table deposited on a porous substrate, and as an additive at least one amino alkoxy-silane, wherein the catalyst is in sulfurized form.

10. A process for preparation of a catalyst comprising at least one element of groups VIB and VIII of the periodic table deposited on a porous substrate, and as an additive at least one amino alkoxy-silane, the process comprising impregnation of a porous substrate by the metal or metals of group VIB and/or group VIII and the deposit on said substrate of said organic compound, and a sulfurization stage.

* * * * *

UNITED STATES PATENT AND TRADEMARK OFFICE
CERTIFICATE OF CORRECTION

PATENT NO. : 7,235,173 B2  Page 1 of 1
APPLICATION NO. : 10/612288
DATED : June 26, 2007
INVENTOR(S) : Fabrice Diehl et al.

It is certified that error appears in the above-identified patent and that said Letters Patent is hereby corrected as shown below:

Column 12, line 49, reads "catalyst is produced 0.05" should read -- catalyst produced is 0.05 --
Column 12, line 54, reads "mat per mol" should read -- mol per mol --

Signed and Sealed this

Fifteenth Day of April, 2008

JON W. DUDAS
*Director of the United States Patent and Trademark Office*